United States Patent
Tojo

(10) Patent No.: US 7,593,443 B2
(45) Date of Patent: Sep. 22, 2009

(54) SOLID LASER APPARATUS EXCITED BY A SEMICONDUCTOR LASER

(75) Inventor: Koji Tojo, Sagamihara (JP)

(73) Assignee: Shimadzu Corporation, Kyoto (JP)

( * ) Notice: Subject to any disclaimer, the term of this patent is extended or adjusted under 35 U.S.C. 154(b) by 95 days.

(21) Appl. No.: 11/989,260

(22) PCT Filed: Jul. 26, 2005

(86) PCT No.: PCT/JP2005/013610

§ 371 (c)(1),
(2), (4) Date: Jan. 23, 2008

(87) PCT Pub. No.: WO2007/013134

PCT Pub. Date: Feb. 1, 2007

(65) Prior Publication Data

US 2009/0135862 A1    May 28, 2009

(51) Int. Cl.
*H01S 3/14*    (2006.01)
*H01S 5/00*    (2006.01)

(52) U.S. Cl. ..................... 372/49.01; 372/39

(58) Field of Classification Search .............. 372/39, 372/49.01
See application file for complete search history.

(56) References Cited

U.S. PATENT DOCUMENTS 6,111,900 A    8/2000    Suzudo

FOREIGN PATENT DOCUMENTS

| JP | 64-31485 | 2/1989 |
|---|---|---|
| JP | 4-318988 | 11/1992 |
| JP | 10-256638 | 9/1998 |
| JP | 2000-208849 | 7/2000 |
| JP | 3509598 | 1/2004 |

OTHER PUBLICATIONS

J. Opt. Soc. Am. B. vol. 3, No. 9, P1175 (1986) Large-amplitude fluctuations due to longitudinal mode coupling in diode-pumped intracavity-doubled Nd:YAG lasers.
Lasers at p534 (University Science Books, Mill Valley, Ca., 1986).
J. Opt. Soc. Am. B. vol. 3, No. 9, P1175 (1986) Large-amplitude fluctuations due to longitudinal mode coupling in diode-pumped intracavity-doubled Nd:YAG lasers.
Lasers at p534 (University Science Books, Mill Valley, Ca., 1986).

*Primary Examiner*—Armando Rodriguez
(74) *Attorney, Agent, or Firm*—Jordan and Hamburg LLP

(57) ABSTRACT

Single mode oscillation at a wavelength of about 1064.4 nm is enabled with no use of an etalon installed in an optical resonator by providing one of two ends of a Nd:YAG element, which acts as one end of the optical resonator, with an HR coating arranged for the wavelength of about 1064.4 nm and determining the thickness along the direction of transmission of light of the Nd:YAG element so that the peak of reflection appears at the wavelength of about 1064.4 nm but not at a wavelength of about 1062.8 nm.

15 Claims, 2 Drawing Sheets thickness of Nd:YAG  41mm        FSR 0.76

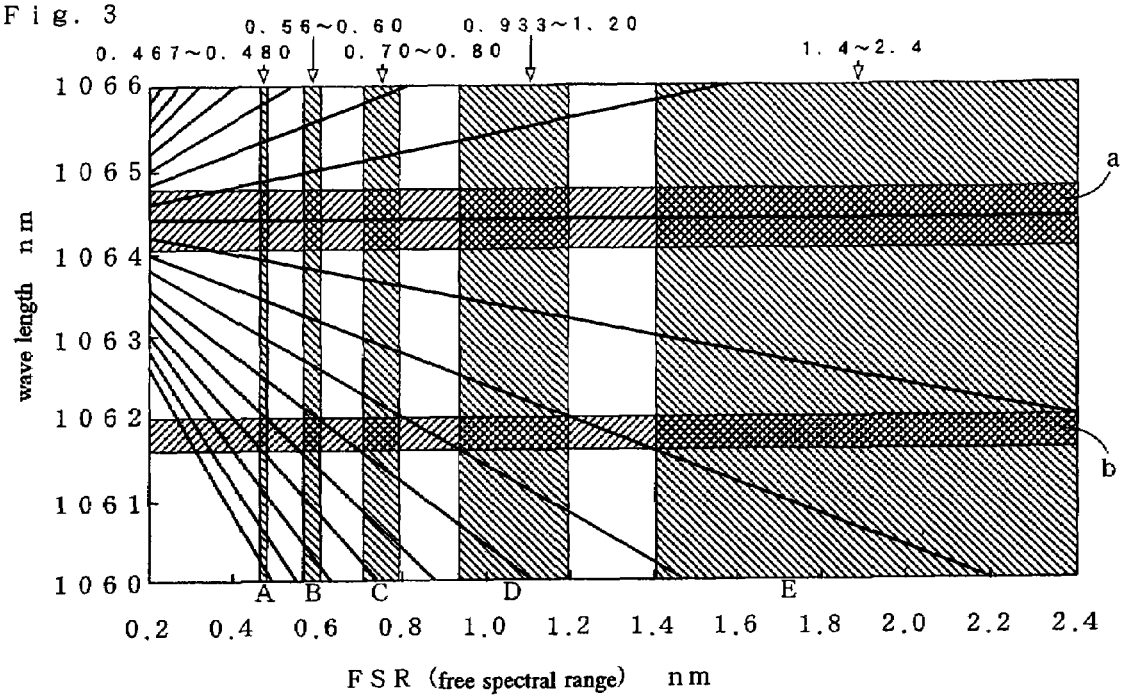

SOLID LASER APPARATUS EXCITED BY A SEMICONDUCTOR LASER

FIELD OF THE INVENTION

The present invention relates to a semiconductor laser excited solid-state laser apparatus and more particularly to a semiconductor laser excited solid-state laser apparatus for producing signal mode oscillation at a wavelength of about 1064.4 nm with no use of an etalon installed in an optical resonator.

BACKGROUND OF THE INVENTION

A technique has been known for installing a wavelength selector device in an optical resonator and coating one end of a YAG crystal with a tri-chromacy coating in order to produce oscillation at a wavelength of 1.06 µm and oscillation at a wavelength of 1.32 µm simultaneously in the YAG crystal through excitation with a semiconductor laser and selectively promote the latter oscillation while suppressing the former oscillation (for example, as shown in Patent Citation 1).

Also, another technique has been known for installing an etalon in an optical resonator and modifying the temperature of the etalon so as to match the transmission peak of the etalon with the peak wavelength of the laser output (for example, as shown in Patent Citation 2).

A further technique has been known for, when two or more longitudinal modes are provided for wavelength conversion with a nonlinear optical crystal installed in an optical resonator, minimizing the generation of mode competition noise caused by from coupling of the modes through sum frequency generation can be done by making the longitudinal mode into a single mode (for example, as shown in Non-patent Citation 1).

Also, a still further technique has been known for controlling the oscillation mode through creating a second resonator in the optical resonator (for example as shown in Non-patent Citation 2).

Patent Citation 1: Japanese Patent Laid-open Publication No. (Showa) 64-31485.
Patent Citation 2: Japanese Patent No. 3509598.
Non-patent Citation 1: J. Opt. Soc. Am. B. Vol. 3, No. 9, P 1175 (1986).
Non-patent Citation 2: Lasers at p 534 (University Science Books, Mill Valley, Ca., 1986).

DISCLOSURE OF THE INVENTION

Problems that the Invention is to Solve

It is desired for producing the single mode oscillation at about 1064.4 nm to transit the energy level of Nd:YAG laser from $^4F_{3/2}$ to $^4I_{11/2}$. However, the energy level is duly divided into sub levels or Stark levels and the oscillation line at about 1064.4 nm for transition from a sub level $R_2$ to a sub level $Y_3$ stays very close to the oscillation line at about 1061.8 nm for transition from a sub level $R_1$ to a sub level $Y_1$. It is hence necessary for producing the single mode oscillation at about 1064.4 nm to suppress the oscillation line at about 1061.8 nm.

Nevertheless, no technique of suppressing the oscillation line at about 1061.8 nm has been proposed for producing the single mode oscillation at about 1064.4 nm.

Meanwhile, the known technique of installing an etalon in the optical resonator becomes intricate in the arrangement with the number of its components being increased and may generate some losses in the resonator including reflection loss and absorption loss which are derived from the characteristics of the etalon.

Also, the known technique for providing the YAG crystal at one end with a tri-chromacy coating may find it difficult to produce the single mode oscillation at about 1064.4 nm with suppressing only the oscillation line at about 1061.8 nm.

It is hence an object of the present invention to provide a semiconductor laser excited solid-state laser apparatus which has an arrangement with no etalon installed in the optical resonator for producing single mode oscillation at a wavelength of about 1064.4 nm.

Means for Solving the Problems

As a first feature of the present invention, a semiconductor laser excited solid-state laser apparatus is provided having a nonlinear optical crystal installed in an optical resonator, where a solid-state laser medium is provided to be excited by the laser beam emitted from a semiconductor laser, for producing and outputting a harmonic of the fundamental wave oscillated in the optical resonator while detecting a portion of the harmonic and controlling the driving current of the semiconductor laser so that the harmonic remains constant, wherein the solid-state laser medium is Nd:YAG, the Nd:YAG has two ends thereof extending vertical to the optical axis, the Nd:YAG is arranged to be coated at one of the two ends which acts as one end of the optical resonator with an HR coating acting on the light produced by transition of energy from level $^4F_{3/2}$ to level $^4I_{11/2}$, and the Nd:YAG functions as a band reflecting mirror with its two ends interfering the reflected light and its thickness along the direction of transmission of light is arranged of which the reflectivity becomes maximum to the light produced by transition of energy from sub level $R_2$ to sublevel $Y_3$ and minimum to the light produced by transition of energy from sub level $R_1$ to sub level $Y_1$.

The semiconductor laser excited solid-state laser apparatus of the first feature is provided with the HR coating which covers over the one end, at one end of the optical resonator, of the Nd:YAG and acts on the light produced by transition of energy from level $^4F_{3/2}$ to level $^4I_{11/2}$, whereby the oscillation at a wavelength of about 1.06 µm can selectively be promoted while the oscillation at a wavelength of about 1.32 µm is suppressed. The other end at the semiconductor laser side of the Nd:YAG may be provided with no coating or a coating having a degree of the reflectivity.

Since its two ends extend parallel to each other (vertical to the optical axis), the Nd:YAG functions as a band reflective mirror having a characteristic of wavelength selection. Accordingly, when the Nd:YAG is properly tuned by controlling the thickness of the Nd:YAG so that, for example, its reflectivity becomes maximum for the light produced by transition of energy from sub level $R_2$ to sub level $Y_3$ and minimum for the light produced by transition of energy from sub level $R_1$ to sub level $Y_1$, the single mode oscillation of light at a wavelength of about 1064.4 nm produced by transition of energy from sub level $R_2$ to sub level $Y_3$ can be promoted while the oscillation line of light at a wavelength of about 1061.8 nm produced by transition of energy from sub level $R_1$ to $Y_1$ is suppressed.

In case that an etalon of which one end extends vertical to the optical axis is installed in the optical resonator as shown in FIG. 2 of Patent Citation 1, the light reflected on its surface is resonated in the optical resonator to develop a second resonator which may be different in the characteristic of wavelength selection from the etalon. Alternatively, when the two ends of an etalon are tilted from the optical axis as shown in FIG. 1 of Patent Citation 2, the development of a second resonator will be avoided. However, the tilting of the one end will decline the transmission finesse and create a loss in the resonator thus reducing the efficiency of the laser oscillating action.

The present invention has the two ends of the Nd:YAG arranged to extend vertical to the optical axis and can thus allow the second resonator, even if it is developed in the optical resonator, to be equal in the characteristic of wavelength selection to the band reflective mirror of the Nd:YAG, hence eliminating such a drawback of the etalon installed in the optical resonator. In addition, since its two ends extend vertical to the optical axis, the Nd:YAG will hardly disturb the transmission finesse, thus eliminating such a drawback derived from the tilting of the Nd:YAG.

As a second feature of the present invention, the semiconductor laser excited solid-state laser apparatus of the first feature may be modified in which the thickness along the direction of transmission of light of the Nd:YAG is arranged to provide the peak of the reflectivity at a wavelength of about 1065.5 nm but not at a wavelength of about 1061.8 nm.

The semiconductor laser excited solid-state laser apparatus of the second feature is provided with the HR coating which covers over the one end, at one end of the optical resonator, of the Nd:YAG and acts on the wavelength of about 1064.4 nm, whereby the oscillation at a wavelength of about 1.06 μm can selectively be promoted while the oscillation at a wavelength of about 1.32 μm is suppressed. The other end at the semiconductor laser side of the Nd:YAG may be provided with no coating or a coating having a degree of the reflectivity.

Since its two ends extend parallel to each other (vertical to the optical axis), the Nd:YAG functions as a band reflective mirror having a characteristic of wavelength selection. Accordingly, when the Nd:YAG is properly tuned by controlling the thickness of the Nd:YAG so that, for example, its reflectivity becomes peaked at a wavelength of 1064.4 nm±0.35 nm (as denoted by the hatching a in FIG. 2) but not at a wavelength of 1061.8 nm±0.2 nm (as denoted by the hatching b in FIG. 2), the single mode oscillation of light at the wavelength of about 1064.4 nm can be promoted while the oscillation line of light at the wavelength of about 1061.8 nm is suppressed.

As a third feature of the present invention, the semiconductor laser excited solid-state laser apparatus of the first or second feature may be modified in which the thickness along the direction of transmission of light of the Nd:YAG is set to a range from 0.13 to 0.22 mm, from 0.26 to 0.33 mm, from 0.39 to 0.44 mm, from 0.51 to 0.55 mm, or from 0.65 to 0.67 mm.

FIG. 3 illustrates the relationship between the FER (free spectral range) of reflectivity property of the Nd:YAG and the wavelength at the reflectivity peak. In FIG. 3, the straight lines extending radially represent the wavelengths at the reflectivity peak on the Nd:YAG in relation to the FSR. It is noted that the temperature of the Nd:YAG is tuned so that one of the peaks of the reflectivity corresponds to the wavelength of about 1064.4 nm targeted by the present invention regardless of the FSR.

The horizontal region a shown in FIG. 3 extends along the wavelength of about 1064.4 nm while the horizontal region b extends along the wavelength of about 1061.8 nm. The vertical regions A, B, C, D, and E represent ranges of the FSR where the peak of the reflectivity on the Nd:YAG is present in the region abut not present in the region b. As apparent from FIG. 3, the single mode oscillation at the wavelength of about 1064.4 nm can be promoted while the oscillation line at the wavelength of about 1061.8 nm is suppressed, when the FSR is from 0.467 to 0.480, from 0.56 to 0.60, from 0.70 to 0.80, from 0.933 to 1.20, or from 1.4 to 2.4. The ranges of the FSR are equivalent to 0.13-0.22 mm, 0.26-0.33 mm, 0.39-0.44 mm, 0.51-0.55 mm, and 0.65-0.67 mm of the thickness of Nd:YAG.

As a fourth feature of the present invention, the semiconductor laser excited solid-state laser apparatus of any of the first to third features may be modified further comprising a means for tuning the temperature of the Nd:YAG.

It is needed to control the thickness of the Nd:YAG on the order of 10 nm for determining the thickness along the direction of transmission of light of the Nd:YAG with the temperature of the Nd:YAG remaining at a uniform degree so that the peak of the reflectivity appears at the wavelength of about 1064.4 nm but not at the wavelength of 1061.8 nm. This may be fulfilled by a polishing process. However, the polishing process subjected to the needed task at high accuracy will result in the cost up.

According to the fourth feature of the semiconductor laser excited solid-state laser apparatus, the polishing process is not enhanced to an accuracy on the order of 10 nm but its resulting variations in the thickness are offset by controllably tuning the temperature of the Nd:YAG. This will prevent the polishing process at high accuracy from increasing the cost.

As a fifth feature of the present invention, the semiconductor laser excited solid-state laser apparatus of the fourth feature may be modified in which the thickness along the direction of transmission of light of the Nd:YAG is set to a range from 0.31 to 0.33 mm, from 0.39 to 0.44 mm, from 0.51 to 0.55 mm, or from 0.65 to 0.67 mm.

The rate of change $d\lambda/dT$ of the reflected light at a wavelength on the band reflective mirror of the Nd:YAG to the temperature is expressed by $$d\lambda/dT = \lambda\{1/n\}(dn/dT) + \alpha\}$$

where $\lambda$ is the wavelength, n is the refractive index of the Nd:YAG, and $\alpha$ is the linear expansion coefficient of the Nd:YAG. When $\lambda$=1064.4 nm, n=1.82, $dn/dT$=9.05×10$^{-6}$/K, and $\alpha$=7×10$^{-6}$/K, $d\lambda/dT$ is 0.013 nm/° C.

Using $d\lambda/dT$, the gain band of the Nd:YAG is tuned so that its reflectivity peak appears at a wavelength of about 1064.4 nm. In practice, the gain band shifts towards the longer wavelength side as the temperature increases. The shift $\Delta\lambda$ is expressed by 0.003 nm/° C. Accordingly, the tunability of the etalon with the temperature for a difference in the wavelength between the reflectivity peak and the gain band is 0.01 nm/° C. (=0.013-0.003 nm/° C.).

With consideration of the thermal resistivity of component materials, the variable temperature range on the Nd:YAG may be 100° C. Hence, the width of the wavelength to be swept by turning the temperature is 1 nm (0.01 nm/° C.×100° C.). In common, the action of modifying the temperature to tune the reflectivity peak to a desired wavelength is conditioned by a degree which can sweep the FSR determined by the thickness of the Nd:YAG.

The FSR is expressed by $$FSR = \lambda^2/(2 \cdot n \cdot L)$$

where L is the thickness of the Nd:YAG.

The thickness of the Nd:YAG is 0.31 mm for maintaining the FSR to 1 nm (the wavelength width which can be swept by modifying the temperature). This represents a lower limit condition (0.31 mm or greater) of the thickness L of the Nd:YAG.

The upper limit condition of the thickness L of the Nd:YAG is determined by a fact that the FSR is greater than a half the gain band width for selecting at least one of the vertical modes in the gain band. More particularly, as the gain band width of the Nd:YAG is substantially 0.7 nm, the FSR is not smaller than 0.35 nm which is equivalent to 0.89 mm of the thickness L of the Nd:YAG. Accordingly, the upper limit condition of the thickness L of the Nd:YAG is "not greater than 0.89 mm".

Considering that the condition is not smaller than 0.31 mm at the lower limit and not greater than 0.89 mm at the upper limit, the thickness of the Nd:YAG is preferably ranged from 0.31 to 0.33 mm, from 0.39 to 0.44 mm, from 0.51 to 0.55 mm, or from 0.65 to 0.67 mm.

As a sixth feature of the present invention, the semiconductor laser excited solid-state laser apparatus of any of the first to fifth features may be modified in which the Nd:YAG is provided at the other end of the two ends, which is not the one end of the optical resonator, with no coating.

While the one end of the Nd:YAG acting as one end of the optical resonator is provided with the HR coating, the other end acting not as the one end of the optical resonator is provided with no coating. This will not only simplify the overall production process but also minimize the loss in the resonator such as diffusion or absorption by the effect of the coating, hence ensuring some merits such as improvement of the efficiency and no deterioration of the coating.

As a seventh feature of the present invention, the semiconductor laser excited solid-state laser apparatus of sixth feature may be modified in which the optical length of the optical resonator is not greater than 18 mm.

The inventors of the present invention have found through a series of experiments that the single mode oscillation can be enabled by matching the peak of reflection on the Nd:YAG with substantially one of the resonator modes and permitting a loss of not lower than 0.3% at any neighbor resonator mode. With the one end, at one end of the optical resonator, of the Nd:YAG provided with the HR coating while the other end acting not as the one end of the optical resonator is provided with no coating, the loss of not lower than 0.3% at the neighbor resonator mode is feasible when the interval between any two resonator modes remains not smaller than 0.03 nm. This will be equivalent to not greater than 18 mm of the optical length of the optical resonator.

ADVANTAGE OF THE INVENTION

The semiconductor laser excited solid-state laser apparatus according to the present invention allows the single mode oscillation at a wavelength of about 1064.4 nm to be enabled with no use of an etalon installed in an optical resonator.

BRIEF DESCRIPTION OF THE DRAWINGS

FIG. 3 is a characteristic diagram showing the wavelength at the reflection peak of the Nd:YAG in relation to FSR, in which the primary components are:

1. Semiconductor laser, 3. Nd:YAG element, 3a. HR coating, 4. Temperature tuner, 6. Wavelength converter, 7. Mirror, 8. Optical resonator, 9. Beam splitter, 10. Photo-diode, 11. Semiconductor laser driver circuit, 100. Semiconductor laser excited solid-state laser apparatus.

BEST MODES FOR EMBODYING THE INVENTION

The present invention will be described in more detail referring to some illustrated embodiments. It would be understood that the invention is not limited to the embodiments.

Embodiment 1

Figure 1:
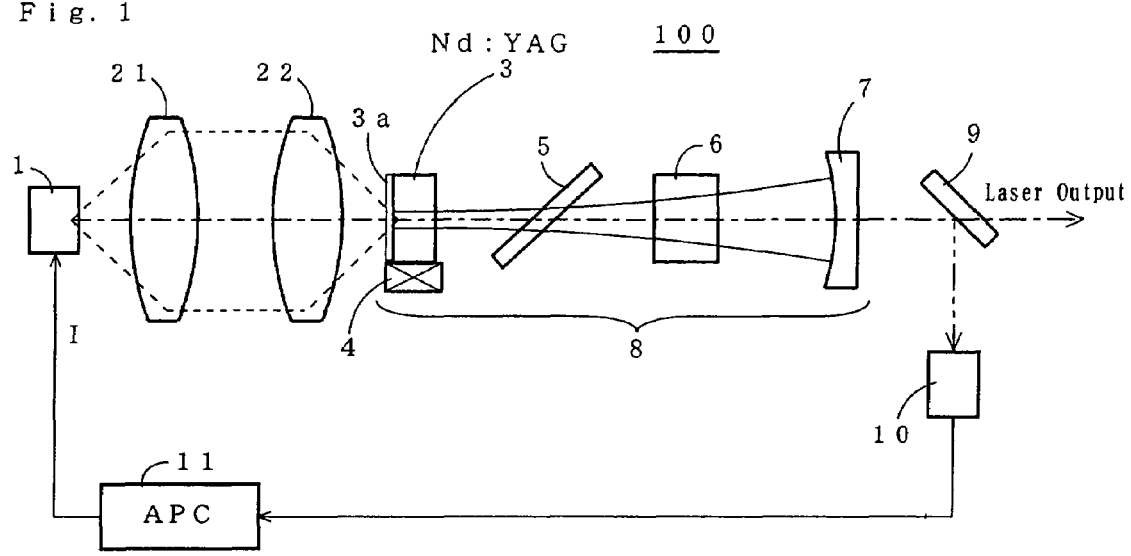
FIG. 1 is a structural explanatory view of a semiconductor laser excited solid-state laser apparatus showing Embodiment 1 of the present invention.

FIG. 1 is a structural explanatory view of a semiconductor laser excited solid-state laser apparatus 100 showing Embodiment 1 of the present invention.

The semiconductor laser excited solid-state laser apparatus 100 comprises a semiconductor laser 1 for emitting an exciting laser beam, a first lens 21 and a second lens 22 for converging the exciting laser beam, a Nd:YAG (solid-state later device) 3 for inducing and emitting a fundamental wave laser beam excited by the exciting laser beam, a temperature tuner 4 for tuning the temperature of the Nd:YAG 3, a Brewster plate 5 for modifying the polarized light, a wavelength converter element 6 for converting the fundamental wave laser beam into a second harmonic light, a mirror 7 for passing the second harmonic light while acting as one end of the optical resonator 8, a beam splitter 9 for extracting a portion of the second harmonic light passed through the mirror 7, a photo diode 10 for converting the second harmonic light received from the beam splitter 9 into an electric signal, and a semiconductor laser driver circuit 11 for controlling the driving current for the semiconductor laser 1 so as to maintain the electric signal at the photo diode 10 to a constant magnitude level.

The semiconductor laser 1 is tuned to a desired temperature by a Peltier device not shown so that the exciting laser beam remains at a wavelength of 808.5 nm which corresponds to the absorption peak of the Nd:YAG 3.

The Nd:YAG 3 is made from a ceramic produced by baking a mono-crystalline or fine crystalline material. the one end of the Nd:YAG 3 which acts as another end of the optical resonator 8 is coated with an HR coating 3a which is high in the transmissivity for a wavelength of 808.5 nm and in the reflectivity for a wavelength of 1064 nm. The other end of the Nd:YAG 3 which is not the one end of the optical resonator 8 remains not coated. The two ends of the Nd:YAG 3 are finished to parallel to each other at an accuracy of not greater than five seconds. Also, the Nd:YAG 3 is positioned with its two ends extending vertical to the optical axis.

The optical resonator 8 is then created between the one end of the Nd:YAG 3 provided with the HR coating 3a and the mirror 7. The optical length of the optical resonator 8 is not greater than 18 mm.

The temperature tuner 4 tunes the temperature of the Nd:YAG 3 along the thickness in the direction of light transmission using its Peltier device so that the peak of reflection appears at a wavelength of about 1064.4 nm but not at a wavelength of about 1061.8 nm.

The wavelength converter 5 is made from a material such as $LiNbO_3$, $LiTaO_3$, $MgO:LiNbO_3$, $MgO:LiTaO_3$, $KNbO_3$, or $KTiOPO_4$ or its polarization inverted substance. The fundamental laser beam at a wavelength of about 1064.4 nm is converted into a second or third harmonic as passed through the wavelength converter 5.

The wavelength converter 5 is also tuned to a desired temperature with the use of not shown Peltier device or heater.

Figure 2:
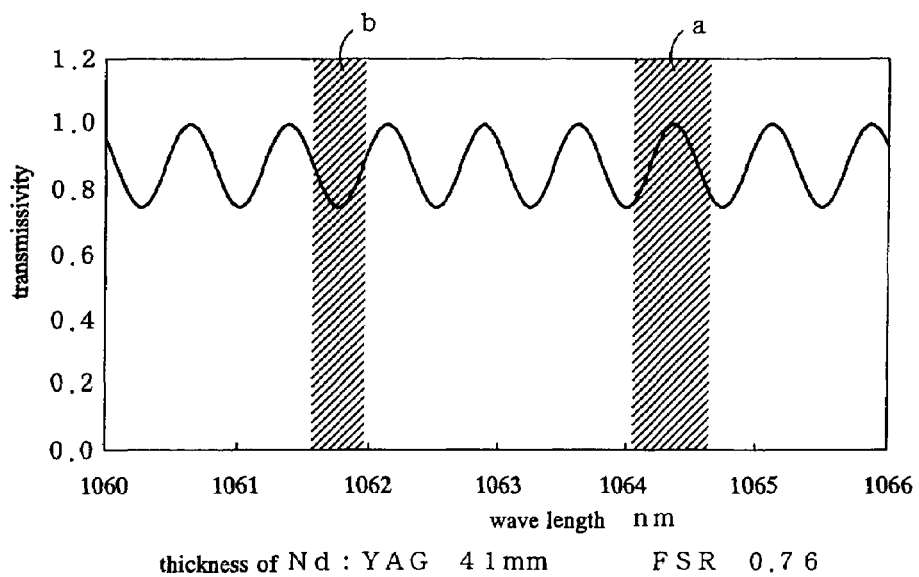
FIG. 2 is a characteristic diagram showing the transmissivity when the thickness of a Nd:YAG element is 0.41 mm.

FIG. 2 is a characteristic diagram showing the reflectivity of the Nd: YAG 3 at the inner side of the resonator when the thickness of the Nd:YAG 3 is 0.41 mm (FSR being 0.76).

The hatching a shown in FIG. 2 represents a gain range about the oscillation line at 1064.4 nm (for example, 1064.4 nm±0.35 nm). The wavelength range in the hatching a has one peak of the reflectivity about which the oscillation occurs.

On the other hand, the hatching b shown in FIG. 2 represents a gain range about the oscillation line at 1061.8 nm (for example, 1061.8 nm±0.2 nm). The wavelength range in the hatching b stays low in the reflectivity, whereby the oscillation will be suppressed.

The semiconductor laser excited solid-state laser apparatus 100 of Embodiment 1 can successfully produce single mode oscillation at about 1064.4 nm with no use of an etalon installed in the optical resonator.

Embodiment 2

The thickness of the Nd:YAG 3 may be set with a range from 0.13 to 0.22 mm, from 0.26 to 0.33 mm, from 0.39 to 0.44 mm, from 0.51 to 0.55 mm, or from 0.65 to 0.67 mm.

A semiconductor laser excited solid-state laser apparatus of Embodiment 2 is arranged where the FSR ranges from 0.467 to 0.480, from 0.56 to 0.60, from 0.70 to 0.80, from 0.933 to 1.20, and from 1.4 to 2.4 as denoted by the hatching areas A, B, C, D, and E respectively in FIG. 3. As shown in the hatching areas A, B, C, D, and E, the peak of the reflectivity appears at about 1064.4 nm but not at about 1061.8 nm. Accordingly, the single mode oscillation is enabled at the wavelength about 1064.4 nm while the oscillation line at the wavelength of about 1061.8 nm is successfully suppressed.

When the thickness of the Nd:YAG 3 is set with a range from 0.31 to 0.33 mm, from 0.39 to 0.44 mm, from 0.51 to 0.55 mm, or from 0.65 to 0.67 mm, it will be suited for a temperature sweep at substantially 100° C.

INDUSTRIAL APPLICABILITY

The semiconductor laser excited solid-state laser apparatuses according to the present invention are applicable to the bio-engineering technologies or the measurement technologies.

What is claimed is:

1. A semiconductor laser excited solid-state laser apparatus having a nonlinear optical crystal installed in an optical resonator, where a solid-state laser medium is provided to be excited by the laser beam emitted from a semiconductor laser, for producing and outputting a harmonic of the fundamental wave oscillated in the optical resonator while detecting a portion of the harmonic and controlling the driving current of the semiconductor laser so that the harmonic remains constant, wherein the solid-state laser medium is Nd:YAG,
the Nd:YAG has two ends thereof extending vertical to the optical axis,
the Nd:YAG is arranged to be coated at one of the two ends which acts as one end of the optical resonator with an HR coating acting on the light produced by transition of energy from level $^4F_{3/2}$ to level $^4I_{11/2}$, and
the Nd:YAG functions as a band reflecting mirror with its two ends interfering the reflected light and its thickness along the direction of transmission of light is arranged of which the reflectivity becomes maximum to the light produced by transition of energy from sub level $R_2$ to sub level $Y_3$ and minimum to the light produced by transition of energy from sub level $R_1$ to sub level $Y_1$.

2. A semiconductor laser excited solid-state laser apparatus according to claim 1, wherein
the thickness along the direction of transmission of light of the Nd:YAG is arranged to provide the peak of the reflectivity at a wavelength of about 1065.5 nm but not at a wavelength of about 1061.8 nm.

3. A semiconductor laser excited solid-state laser apparatus according to claim 1 or 2, wherein
the thickness along the direction of transmission of light of the Nd:YAG is set to a range from 0.13 to 0.22 mm, from 0.26 to 0.33 mm, from 0.39 to 0.44 mm, from 0.51 to 0.55 mm, or from 0.65 to 0.67 mm.

4. A semiconductor laser excited solid-state laser apparatus according to claims 1 or 2, further comprising:
a means for tuning the temperature of the Nd:YAG.

5. A semiconductor laser excited solid-state laser apparatus according to claim 4, wherein
the thickness along the direction of transmission of light of the Nd:YAG is set to a range from 0.31 to 0.33 mm, from 0.39 to 0.44 mm, from 0.51 to 0.55 mm, or from 0.65 to 0.67 mm.

6. A semiconductor laser excited solid-state laser apparatus according to claims 1 or 2, wherein
the Nd:YAG is provided at the other end of the two ends, which is not the one end of the optical resonator, with no coating.

7. A semiconductor laser excited solid-state laser apparatus according to claims 1 or 2, wherein
the optical length of the optical resonator is not greater than 18 mm.

8. A semiconductor laser excited solid-state laser apparatus according to claim 3, further comprising:
a means for tuning the temperature of the Nd:YAG.

9. A semiconductor laser excited solid-state laser apparatus according to claim 3, wherein
the Nd:YAG is provided at the other end of the two ends, which is not the one end of the optical resonator, with no coating.

10. A semiconductor laser excited solid-state laser apparatus according to claim 4, wherein
the Nd:YAG is provided at the other end of the two ends, which is not the one end of the optical resonator, with no coating.

11. A semiconductor laser excited solid-state laser apparatus according to claim 5, wherein
the Nd:YAG is provided at the other end of the two ends, which is not the one end of the optical resonator, with no coating.

12. A semiconductor laser excited solid-state laser apparatus according to claim 3, wherein
the optical length of the optical resonator is not greater than 18 mm.

13. A semiconductor laser excited solid-state laser apparatus according to claim 4, wherein
the optical length of the optical resonator is not greater than 18 mm.

14. A semiconductor laser excited solid-state laser apparatus according to claim 5, wherein
the optical length of the optical resonator is not greater than 18 mm.

15. A semiconductor laser excited solid-state laser apparatus according to claim 6, wherein
the optical length of the optical resonator is not greater than 18 mm.

* * * * *